Sept. 15, 1970  D. E. HARRISON  3,528,174
CABLE TERMINATION PROCESS
Filed June 1, 1967
2 Sheets-Sheet 1
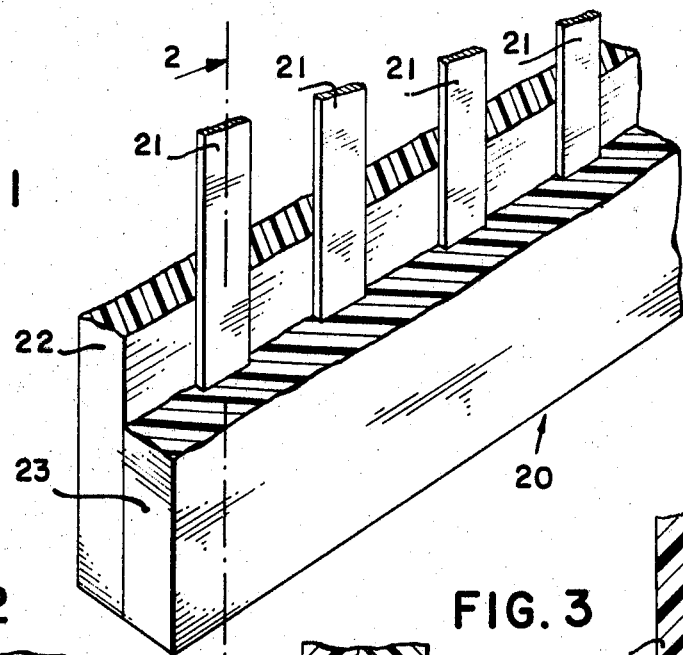
FIG. 1
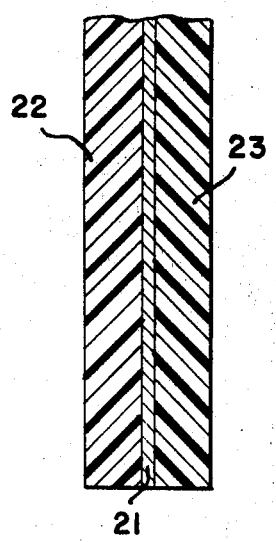
FIG. 2
FIG. 3
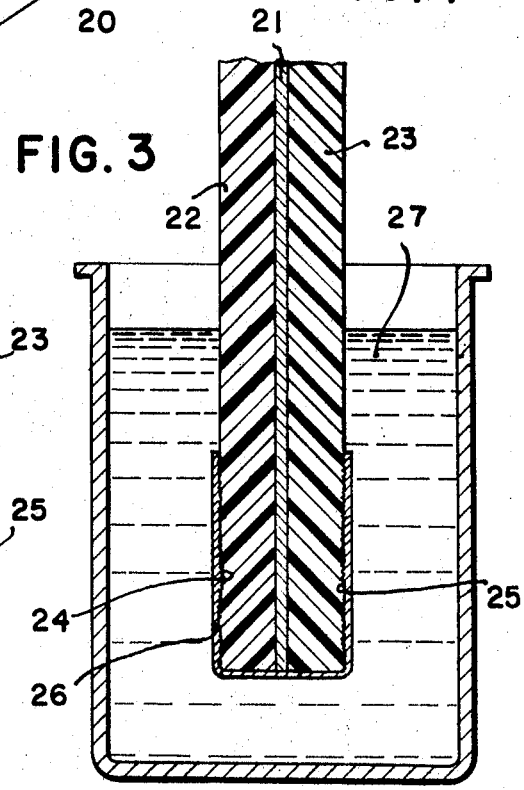
FIG. 4
FIG. 5
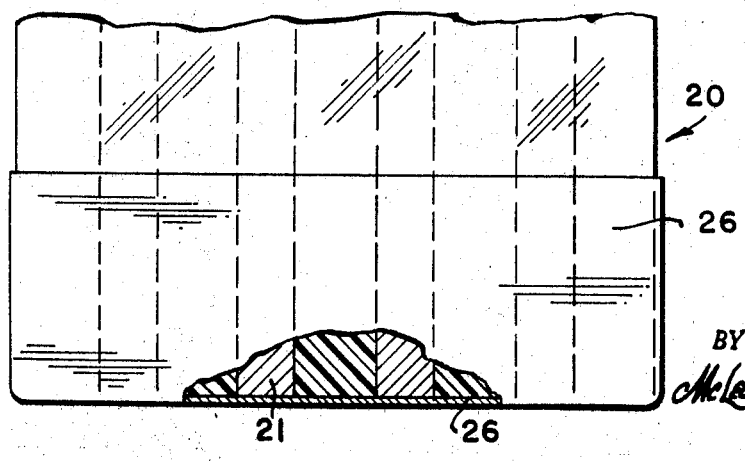
INVENTOR.
DON E. HARRISON
BY
McLean, Morton and Boustead
ATTORNEYS

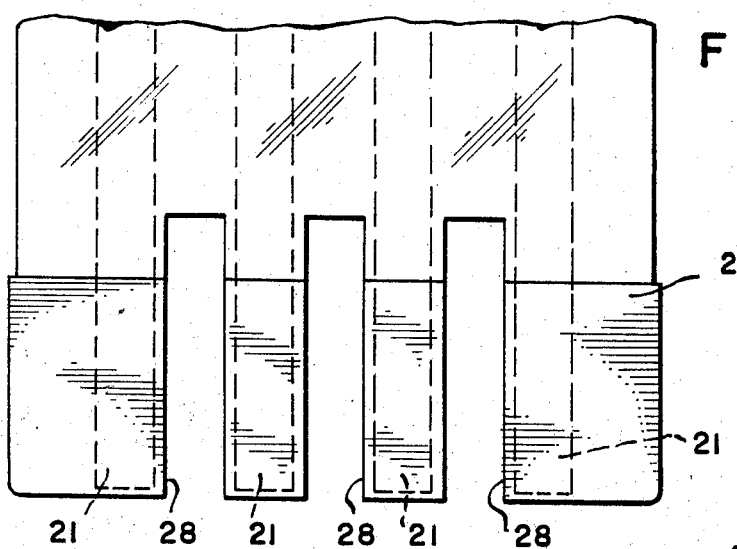
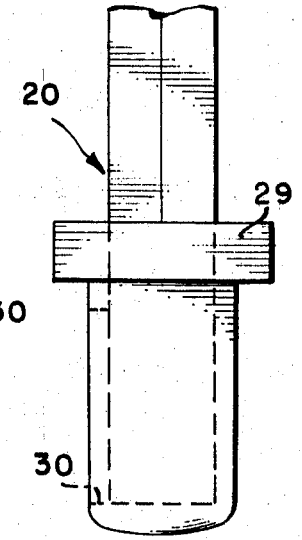
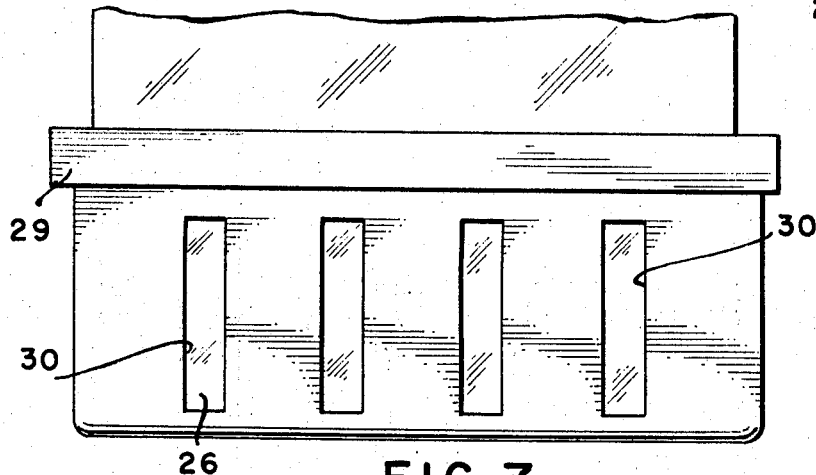
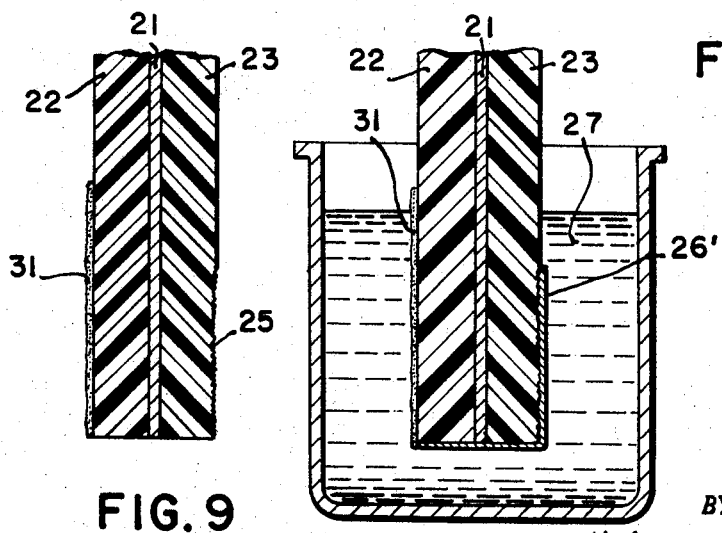

United States Patent Office 3,528,174
Patented Sept. 15, 1970

3,528,174
CABLE TERMINATION PROCESS
Don E. Harrison, Pittsburgh, Pa., assignor to Electro Connective Systems, Inc., Brockton, Mass., a corporation of Massachusetts
Filed June 1, 1967, Ser. No. 642,942
Int. Cl. H02g 15/00
U.S. Cl. 29—629             4 Claims

ABSTRACT OF THE DISCLOSURE

Termination of electric cable having a plurality of conductors which are coplanar by depositing electrically conductive metal on the ends of conductors exposed at an end of the cable, such deposit extending on to a side surface or surfaces of the cable insulation adjacent such end, and by slotting through the cable end between the conductors within the cable to assure that the deposit is in portions electrically isolated one from the other, each being in electrical contact with a conductor within the cable thereby to provide exposed conductive surfaces with which contact can readily be made to permit electrical connection with the conductors within the cable. The sequence of depositing and slotting can be reversed.

---

This invention relates to termination of electric conductors and has particular applicability to termination of conductors contained in multi-conductor cable in which the conductive strands are generally positioned centered on a common plane and spaced from each other in a dielectric covering which functions not only to insulate the conductors, but also to hold them spaced from each other. This invention has particular application, although it is not limited to such application, in the termnation of flat cable wherein the conductive strands are in the form of flat ribbons which are coplanar and wherein the dielectric is in the form of laminae are also flat and thin and between which laminae the conductive strands are sandwiched, such that the cable is extremely light in weight and quite flexible. This invention also has applicability to termination of ribbon cable.

In making terminations of flat cable and ribbon cable it is frequently necessary to expose a portion of the conductive strands by insulation removal in order to make effective mechanical and electrical connection with the conductive strands. In the case of flat cable this can be done by abrasive or chemical removal of one of the dielectric laminae. The former technique must be done manually and with extreme care, particularly in the case of where the conductive strands are flat ribbons, while the latter technique is limited to those cables in which one of the dielectric laminae can readily be removed by chemical means. It is thus a general object of the present invention to provide a simple method for providing exposed conductive portions electrically connected to the conductive strands of a cable in order to facilitate making electrical contact with such conductive strands without the need of exposing the conductive strands by removing insulation.

This and other objects of this invention are accomplished by depositing conductive metal on the exposed ends of the conductive strands at an end of a flat, ribbon or similar cable, to such an extent that the deposit extends onto one or more side surfaces of the cable. The cable is also slotted between the conductive strands of the cable to assure the deposit is in electrically isolated portions, each such portion being in contact with a conductive strand of the cable thereby providing an exposed conductive metal on the surface of the cable in electrical contact with each conductive strand, such that electrical contact with the strand can readily be made. Preferably the depositing of the conductive material is performed first and then the cable end is slotted between the conductive strands through the deposit where the deposit bridges between the exposed ends of the conductive strands. The cable end can, however, be slotted prior to depositing in which case the depositing technique must be controlled to limit the area of deposit to the slotted portion of the cable end.

Deposition of conductive material can usefully be accomplished in accordance with many known techniques, such as vacuum depositing, spraying, electroplating, etc.

For a more complete understanding of the practical application of this invention, reference is made to the appended drawings in which:

FIG. 1 is a partially cut-away, perspective view of an end of a flat cable;

FIG. 2 is a longitudinal section of the end of the cable shown in FIG. 1 taken at line 2—2 of FIG. 1;

FIG. 3 is a view similar to that in FIG. 2 illustrating a step preliminary to carrying out the method of this invention;

FIG. 4 is a view similar to FIG. 3 showing one step of the method of this invention;

FIG. 5 is a plan view of the cable end after the step of FIG. 4;

FIG. 6 is a view similar to FIG. 5 illustrating the result of a further step in accordance with this invention;

FIG. 7 is a plan view illustrating a typical termination device utilizing the termination method of this invention to prepare a cable end for mounting the termination device;

FIG. 8 is an edge view of the termination device shown in FIG. 7;

FIG. 9 is a view similar to FIG. 3 illustrating a slightly different step preliminary to carrying out the method of this invention; and FIG. 10 is a view similar to FIG. 4 illustrating the result of the different preliminary step shown in FIG. 9.

Referring more particularly to FIGS. 1 and 2, the reference numeral 20 generally designates a flat cable including a number of ribbon conductors 21 (four are shown in the illustrated case) which are distributed parallel to each other and are coplanar, being separated equally distant from each other and which are sandwiched between a pair of dielectric laminae 22 and 23 which are adhesively or cohesively bonded to each other and to conductors 21 to provide integral electrical insulation about each conductor 21 and to retain conductors 21 separated from each other. It will be noted particularly referring to FIG. 2 that preparatory to terminating a flat cable 20, in accordance with the present invention, desirably the end of the cable is cut clean transversely across cable 20 such that the ends of conductors 21 are flush with the ends of dielectric laminae 22 and 23.

Referring to FIG. 3, preparatory to carrying out the present invention, it is desirable to treat the side surfaces of dielectric laminae 22 and 23 adjacent the end of cable 20 to be terminated in order to make such surfaces receptive to a deposit of conductive metal. Such pretreatment can take the form of roughing with sand paper, grinding wheel, or the like, as is indicated in FIG. 3 by reference numerals 24 and 25.

The end of cable 20 is then immersed in a bath 27 of a suitable electroplating solution (see FIG. 4) and a deposit 26 of conductive metal is electroplated on the end of cable 20 immersed in such solution. Deposit 26, which preferably is of gold, initially is laid down on the ends of conductive strands 21 and then spreads across the end face of cable 20, ultimately bridging between strands 21 and ultimately extending up the sides of laminae 22 and 23 where roughened at 24 and 25. Thereafter the end of cable 20 is removed from bath 27. It will be noted, referring to FIG. 5, that deposit 26 is thus formed entirely about the end of cable 20 and along the sides of cable 20 for the short distance in which the side surfaces of laminae 22 and 23 were roughened.

Referring to FIG. 6, the end of cable 20 is then slotted, as indicated by the reference numerals 28, by die stamping or similar operation to cut slots 28 entirely through cable 20 at the end on which deposit 26 is formed. Slots 28 extend along the length of cable 20 a greater distance than deposit 26 and which are located between each adjacent pair of conductive strands 21. At this point, deposit 26 is thus divided into a number of electrically isolated portions which are associated with each conductor strand 21 and electrically connected to such strand 21. These portions of deposit 26 are exposed and can be readily connected electrically to other devices, preferably by forming a termination device on the end of cable 20 of the portions of deposit 26.

Such a termination device is illustrated in FIGS. 7 and 8 in the illustrated case can have the form of a plug 29 integrally molded about the end of cable 20 which is designed to have windows 30 corresponding in location with the various portions of deposit 26 associated with each conductive strand 21. Such portions of deposit 26 are thus exposed for contact with a suitable receptacle. Preferably windows 30 are cut in one side only of plug 29 in order to provide rigid backing for cable 20 in plug 29.

It will be apparent that, although the deposit 26 can be grown on both sides of cable 20, its practical utilization does not require its presence on more than one of dielectric laminae 22 or 23. Thus, referring to FIG. 9, while the end surface of lamina 23 is roughened, as indicated by the reference numeral 25, the corresponding portion of lamina 22 is provided with a coating of material which resists adherence of the deposit, for example, a coating of a silicone grease, as indicated by the reference numeral 31, which is extended along the surface of lamina 22 a greater distance than the depth of desired immersion in plating bath 27.

Referring to FIG. 10, when the end of cable 20 prepared as shown in FIG. 9 is then immersed in plating bath 27 the deposit 26 which is formed extends up on the roughened surface of lamina 23 but does not extend up on the coated surface of lamina 22. The resultant cable end is then cleaned to remove coating 31 and slotted, as illustrated with reference to FIG. 6, for subsequent use.

I claim:
1. A method for terminating an electric cable, which cable includes a plurality of electric conductors spaced apart and centered on a common plane in a dielectric covering with the ends of the conductors exposed at an end of the cable, which method is composed of the steps of: depositing electrically conductive metal on the exposed conductor ends at an end of a said cable, such deposit being sufficient to extend onto a side surface of a said covering, slotting said covering and deposit between adjacent pairs of said conductors to assure said deposit is in a plurality of electrically isolated portions, each of which is electrically connected to a said conductor, and molding a connector body about said covering and portions of said deposit while leaving other portions of said deposit exposed for external electrical connection.

2. A method according to claim 1 in which said cable is a flat cable wherein said conductors are flat and coplanar.

3. A method according to claim 1 in which said depositing is by electroplating a deposit.

4. A method for terminating a flat electric cable, which cable includes a plurality of electric conductors spaced apart and centered on a common plane sandwiched between a pair of dielectric laminae with the ends of the conductors exposed at an end of the cable, which method is composed of the steps of: plating a deposit of electrically conductive metal on the exposed conductor ends at an end of a said cable, such deposit being sufficient in extent to bridge between such conductor ends and to extend onto a side surface of a said lamina, slotting said dielectric laminae and deposit between adjacent pairs of said conductors to divide said deposit into a plurality of electrically isolated portions, each of which is electrically connected to a said conductor, and molding a connector body about said laminae and portions of said deposit while leaving other portions of said deposit exposed for external electrical connection.

References Cited

UNITED STATES PATENTS

| | | |
|---|---|---|
| 1,782,447 | 11/1930 | Scrantoni. |
| 2,111,107 | 3/1938 | Walde _____ 29—630 XR |
| 2,786,985 | 3/1957 | Merletey _____ 29—597 XR |
| 2,862,992 | 12/1958 | Franz. |
| 3,029,495 | 4/1962 | Doctor. |
| 3,278,887 | 10/1966 | Travis. |
| 3,321,657 | 5/1967 | Granitsos et al. |
| 3,197,729 | 7/1965 | Sarazen _____ 339—17 XR |
| 3,243,866 | 4/1966 | Pandapas et al. ____ 29—630 XR |
| 3,340,381 | 9/1967 | Best _____ 117—212 XR |
| 3,395,381 | 7/1968 | Huffnagle _____ 339—17 XR |

FOREIGN PATENTS 932,210  7/1963  Great Britain.

JOHN F. CAMPBELL, Primary Examiner

R. W. CHURCH, Assistant Examiner

U.S. Cl. X.R.

29—529, 598, 625; 117—212; 174—68.5, 74; 204—29; 264—272; 339—5, 17